United States Patent [19]
Bernardin et al.

[11] Patent Number: 5,966,661
[45] Date of Patent: Oct. 12, 1999

[54] METHOD AND APPARATUS FOR A RADIOTELEPHONE SYSTEM OPTIMIZED FOR CELL BOUNDARY COVERAGE RELIABILITY

[75] Inventors: Charles P. Bernardin; Meng F. Yee, both of Richardson, Tex.

[73] Assignee: Nortel Networks Corporation, Montreal, Canada

[21] Appl. No.: 08/768,713

[22] Filed: Dec. 18, 1996

[51] Int. Cl.$^6$ ........................................... H04Q 7/20
[52] U.S. Cl. ........................................ 455/446; 455/422
[58] Field of Search .................... 455/446, 422, 455/561, 522, 423, 424, 67.1, 67.6, 69, 417, 465, 436, 504

[56] References Cited

U.S. PATENT DOCUMENTS

| | | | |
|---|---|---|---|
| 4,309,771 | 1/1982 | Wilkens | 455/69 |
| 5,440,614 | 8/1995 | Sonberg et al. | 455/417 |
| 5,465,390 | 11/1995 | Cohen | 455/423 |
| 5,499,395 | 3/1996 | Doi et al. | 455/422 |

OTHER PUBLICATIONS

William C. Y. Lee, "Mobile Cellular Telecommunications Systems", p. 105, 1989.
Peyton Z. Peebles, "Probability Random Variables and Random Signal Principles" 1980.

*Primary Examiner*—Dwayne D. Bost
*Assistant Examiner*—Tracy M. Legree
*Attorney, Agent, or Firm*—Christopher O. Edwards

[57] ABSTRACT

A robust method for determining the boundaries of cells and the associated reliability of the RF coverage within these boundaries is presented. The invention accurately determines the average range from the base station to the cell edge from RF signal strength measurements with a linear regression approach. The accuracy of this estimate is quantified both as a range uncertainty (e.g. ±100 meters) and as a cell coverage reliability (i.e. area/edge) through 1) simulation, 2) analysis of real data, and 3) theoretical analysis. It is shown that if the estimate of the cell radius meets the desired accuracy, then the corresponding estimates of coverage reliability (both area and edge) are more than sufficiently accurate. It is recommended that radio survey analyses incorporate this test as part of the coverage validation process.

10 Claims, 8 Drawing Sheets

100
4%-6% FRINGE
<3%
<2%
<1%

150
15% FRINGE
<10%
<5%
<1%

METHOD AND APPARATUS FOR A RADIOTELEPHONE SYSTEM OPTIMIZED FOR CELL BOUNDARY COVERAGE RELIABILITY

BACKGROUND OF THE INVENTION

1. Field of the Invention

The present invention relates generally to wireless communications and in particular to cellular telephony.

2. Description of the Related Art

Frequently wireless network designers and equipment suppliers are tasked with providing reliability estimates for coverage of cellular systems. Service providers want to know how reliable their coverage is and want to be able to offer more reliable service to their customers.

Two standard ways to express cell reliability are illustrated in FIG. 1. They are contour (or cell edge) reliability as illustrated in FIG. 1a, which gives the reliability of a user who travels the contour of the cell edge; and cell area reliability as illustrated in FIG. 1b, which gives the reliability of a user who may be anywhere within the confines of the entire cell boundary—not just on the cell edge. Both standards are often specified by a user or service provider.

The coverage probabilities requested by a user typically range from 70% to 99%. For example, public safety users generally require 95% contour reliability which corresponds to no more than a 5% failure within the entire coverage area. Commercial users may be satisfied with 70% contour reliability which translates to a 90% reliability across the entire cell area.

Previous designers were required to perform extensive RF measurements to establish cell boundary and reliability figures of merit. Typically, field engineers would drive the cell area collecting data with a Received Signal Strength Indicator (RSSI) receiver for measuring the received signal strength from a central transmitter. The exact location of the receiver is known through Global Positioning System (GPS) receivers attached to the RSSI receiver. The previous systems and methods for estimating cell coverage and reliability used hundreds and thousands of data points and still came up with estimates that ranged within plus or minus ten percent of actual (later) measurements were reluctantly considered acceptable.

The well known Hata method for estimating path loss is inherently error-prone and is valid over only a very limited range under certain specific conditions. A different correction factor is needed each and every time the method is used. The correction factor may be determined for either a small, medium or large sized city and does not take into account features of the particular cell under study. The unreliability is magnified if used to calculate cell radius and/or reliability.

There is accordingly a need for a new method and apparatus for reliably measuring and predicting the boundary of a cell and for the coverage within the cell in order to solve or ameliorate one or more of the above-described problems.

SUMMARY OF THE INVENTION

An accurate computer implemented method and apparatus for measuring and predicting the RF coverage of single cells is presented. The method measures the distance from the base station to the cell edge and quantifies the accuracy by also specifying a range uncertainty. In addition, the method provides an estimate of the area reliability of the region which is an order of magnitude more accurate than other approaches that estimate the coverage from a proportion of signal strength measurements. Empirical formulas are given that approximate the inaccuracies of both of these estimates.

Since the method uses linear regression to estimate the minimum mean square path loss to the cell edge, the technique represents the best circular approximation to the actual cell edge contour. As such, the method is ideal for cell site planning with omni directional antennas. However, the approach can easily be modified to provide equally valid coverage measurements for sectorized cell sites. This invention applies to any wireless technology to accurately determine the range to desired contours that satisfy the required RF coverage criterion. For example, using standard CW drive test measurements, this technique can help verify that the RF design meets the proper amount of overlap in coverage needed to support the soft hand-off regions of CDMA.

The minimum cell area that must be driven to validate the RF coverage can be calculated from three major cellular design parameters: 1) the amount of lognormal fading in the cell, 2) the desired cell edge uncertainty, and 3) the cell radius.

The limiting factor in determining the quality of RF cellular coverage is the accuracy that is required to estimate the effective cell radius. Estimates of the effective radius of each cell may be included as part of the pre-build validation procedure for any wireless installation.

An object of the invention is to determine the number of signal strength measurements needed to accurately estimate the cell radius R from the base station to the cell edge for both a given cell contour and cell area reliability. A further object of the invention is to estimate the coverage reliability of a cell with a finite number of signal strength measurements. A still further object of the invention is to minimize the area from which samples are taken in estimating cell radius R.

Further features of the above-described invention will become apparent from the detailed description hereinafter.

The foregoing features together with certain other features described hereinafter enable the overall system to have properties differing not just by a matter of degree from any related art, but offering an order of magnitude more efficient use of processing time and resources.

Additional features and advantages of the invention will be set forth in part in the description which follows, and in part will be apparent from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate preferred embodiments of the apparatus and method according to the invention and, together with the description, serve to explain the principles of the invention.

BRIEF DESCRIPTION OF THE DRAWINGS

FIG. 10b illustrates coverage inaccuracy for a 90% cell edge reliability.

DETAILED DESCRIPTION

Figure 1A:
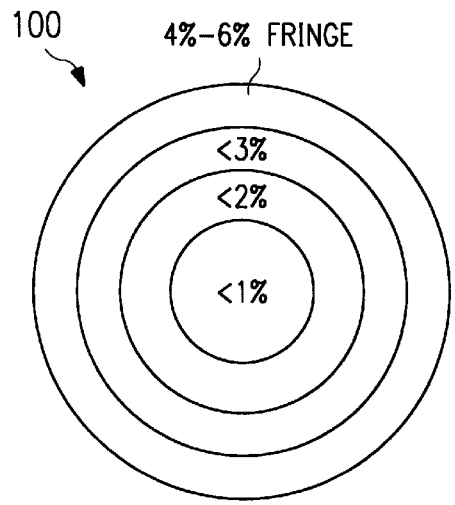
FIG. 1a illustrates a contour reliability diagram of a wireless system with a typical cell edge reliability of 95%.
Figure 1B:
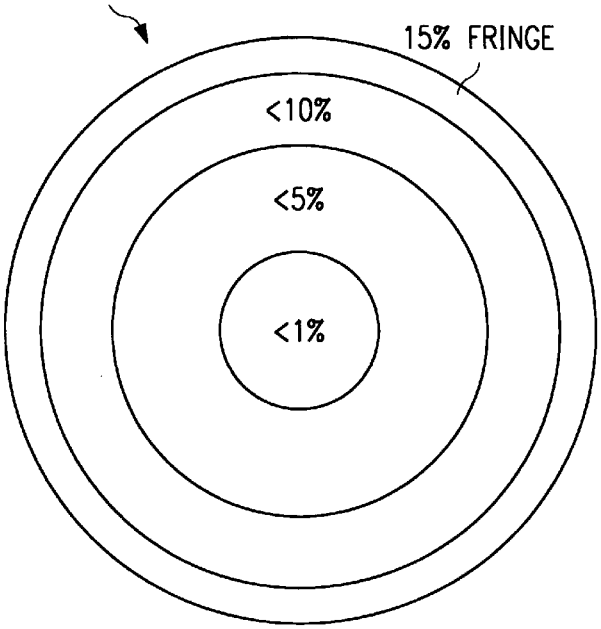
FIG. 1b illustrates an overall area reliability diagram of a wireless system with a typical area reliability of 95%.
Figure 2:
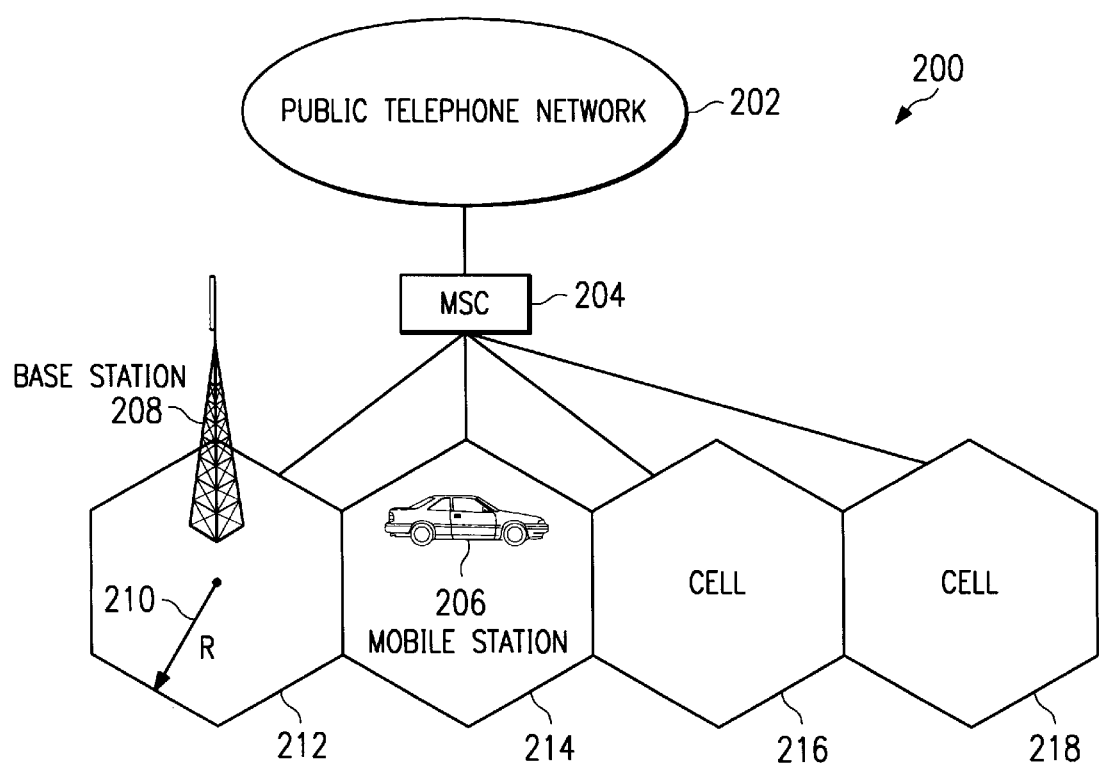
FIG. 2 illustrates an optimized mobile switching system architecture of the present invention.

Referring now to FIG. 2, an optimized mobile switching system architecture 200 of the present invention is disclosed. A mobile switching center (MSC) 204 serves to connect the public telephone network 202 to optimally designed cells 212–218. Each cell 212–218 includes a base station 208 located within its boundary for communicating via radiowaves with a number of mobile stations 206. Each optimally designed cell has a radius R 210 that is particular to the specific cell 212–218.

Figure 3A:
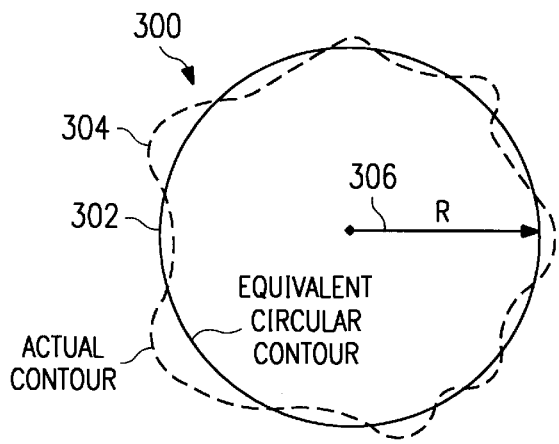
FIG. 3a illustrates the approach to best approximating the actual cell contour.

FIG. 3a illustrates the measurement method of the instant invention. The contour of a cell is estimated based on a sampling of received data. The actual contour of the cell 304 is compared to a circle 302 of radius R 306. The resulting actual cell contour 310 is quantified in terms of a Range Uncertainty Ring 310 of R plus or minus ΔR.

Figure 3B:
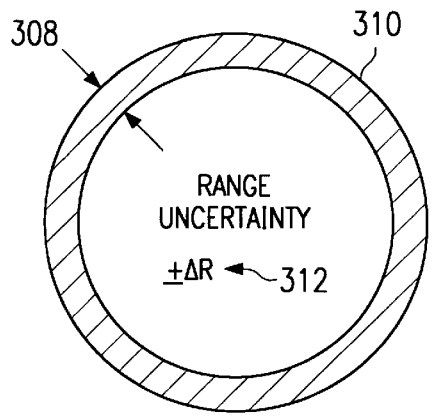
FIG. 3b illustrates the range to cell edge and corresponding range uncertainty ring ΔR.

The accuracy of the estimate of the distance to the cell edge is quantified in terms of a range uncertainty ring, ±ΔR, as shown in FIG. 3b, where ΔR is expressed as a percentage of the total cell radius, R. For 500 signal strength measurements, simulations show that ΔR≈6.5% of the cell radius, which for a 2 km cell radius yields a range uncertainty of ±ΔR≈±130 meters. The accuracies of both the range and coverage estimates increase with increases in the number of signal strength samples processed.

Two methods for determining coverage reliability from drive test data are compared. The first method is the standard approach of estimating the proportion of signal strengths that are above a desired reliability threshold as illustrated in Hill, C. and Olson, B., "A Statistical Analysis of Radio System Coverage Acceptance Testing," *IEEE Vehicular Technology Society News*, February 1994, pp. 4–13 and is hereby incorporated by reference. This method is shown to be much less accurate than the second approach, producing estimates that are easily biased by the nonuniform sampling commonly found in drive test data.

The second approach is the preferred method of the invention. This method involves determining the propagation parameters of individual cells and using this information in conjunction with the analysis by Reudink, D. O., *Microwave Mobile Communications*, edited by Jakes, W. C., IEEE Press, reprinted 1993, ISBN 0-7803-1069-1, Chapter 2, pp. 126–128, which is herein incorporated by reference, (see equation (a7) in the Appendix) to estimate the coverage reliability. The propagation path is approximated by a two-parameter model similar (in appearance only) to Hata. A fade margin based on the actual signal variation within each cell is calculated to ensure the desired cell edge reliability. This technique provides much more accurate coverage estimates which are nearly independent of the spatial location of the signal strength samples. This method estimates the best circular boundary that matches the cell edge contour at the desired reliability, as illustrated in FIG. 3a. An advantage of this approach is that an accurate estimate of the coverage reliability can be made without driving 100% of the cell area. Simulations show that, for cells designed with 75% cell edge reliability, the coverage error is less than 0.5% with as few as 500 signal strength measurements and for 90% cell edge designs the error is less than 0.2%.

Typically, cell radius estimation and area reliability analyses are not considered together in propagation optimization. These two problems cannot be considered independently, and the consequence of doing so can lead to inaccurate estimates of RF performance.

Figure 4:
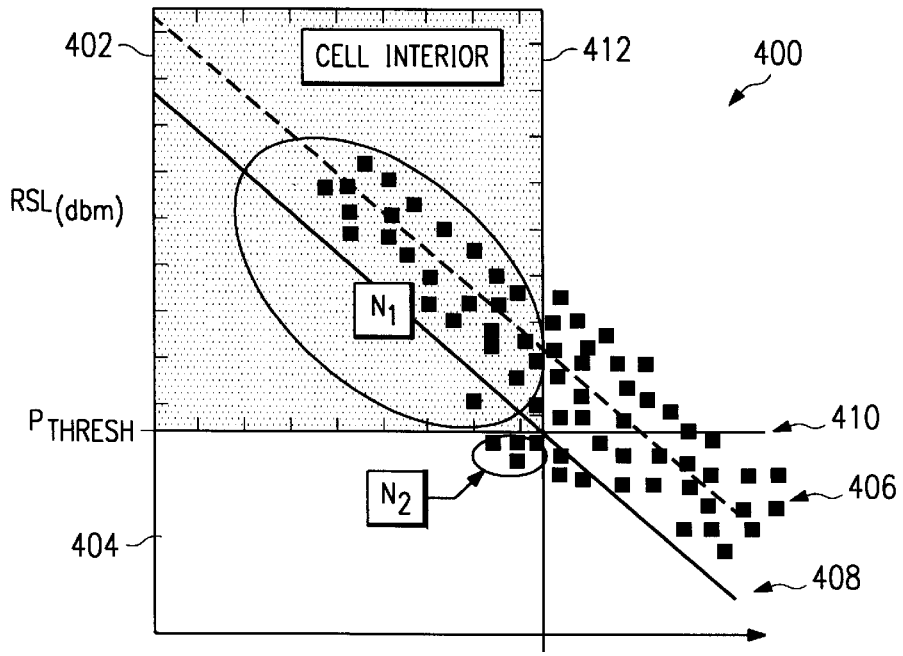
FIG. 4 illustrates a graphical approach to estimating cell radius R.

The proposed approach for estimating the cell radius is graphically summarized in FIG. 4. Item 400 graphically represents all driveable area around a base station, both within and external to a cell boundary. The areas denoted by rectangles 402 and 404 represent the area within the boundary of a cell of Radius R 412. The received signal level (RSL) is plotted as a function of the logarithm of the distance from the basestation transmitter. Mean path loss is represented by line 406. A fade margin to account for other attenuation is built in to the measurement method. When an RSL falls above a predetermined threshold $P_{THRESH}$ 410 then the range presumably is within the cell radius. When an RSL falls below predetermined threshold $P_{THRESH}$ 410 then the location is used to determine the value of R for a given desired contour reliability.

Area reliability is graphically determined by dividing the number of received signal points N1 above threshold $P_{THRESH}$ 410 by the sum of N1 and the number N2 of received signal points; i.e. Reliability=N1/(N1+N2). Radius R is then adjusted in order to have the Reliability calculation meet its desired target.

Figure 5:
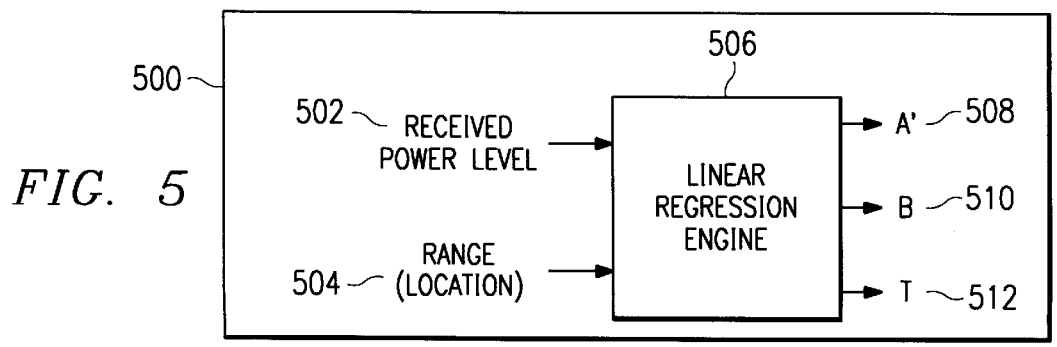
FIG. 5 illustrates a computer system of the present invention including a linear regression engine for estimating parameters for cell radius calculation.

The measurement method for determining radius R as a function of cell contour reliability is based on a two parameter propagation model similar to the prediction formulas of Hata, where $$P_r = P_t - P_L = P_t - A - B\log_{10} r \qquad (1)$$

where $P_r$ is the received power (dBm), $P_t$ is the EIRP of the base station plus the receiver gain (e.g. $P_t$=50 dBm EIRP+ $G_r$), $P_L$ is the path loss (dB), r is the range (km) from the base station, and A and B are the unknown constants to be estimated from the RF data via linear regression as illustrated in FIG. 5. A fade margin based on the actual signal variation within each cell is calculated to ensure the desired cell edge reliability.

Because of the similarity in appearance to Hata's model, it is important to clarify that the method does not incorporate Hata's coefficients. Both Hata and the instant invention utilize a linear approximation methodology. Unlike Hata, in the instant invention, the salient propagation parameters are estimated from the data since the goal in this study is RF measurement, not RF prediction.

The signal strength data received 502 for each cell are first quantized into range bins of 100 meter resolution, where each bin represents an average power measurement at a certain range from the base station. The range axis 504 is then mapped to a logarithmic (common log) scale, the transmit power is combined with the received signal strength parameter, A, and the two parameters of the following equivalent model are estimated via linear regression in the equation $$P_r = A' - B r_L \qquad (2)$$

where $$r_L = \log_{10} r \text{ and } A' = P_t - A.$$

Once the constants A' 508 and B 510 have been estimated, the mean trend of the propagation data is subtracted from the signal strength measurements and the standard deviation, $\sigma$ 512 of the remaining zero-mean process is estimated. The value of $\sigma$ 512 represents the composite variation due to two primary factors: lognormal fading and measurement error. Both of these factors tend to introduce uncorrelated errors since the regression is computed for range measurements across all angles, which greatly reduces most spatial correlation effects.

A fade margin, $FM_\sigma$ that ensures the desired service reliability, F(z), can then be approximated (see equation (a4) in Appendix)

$$FM_{94} = z\sigma \qquad (3)$$

where $$F(z) = \frac{1}{\sqrt{2\pi}} \int_{-\infty}^{z} e^{-\frac{t^2}{2}} dt \qquad (4)$$

For example, cell edge reliabilities of 75% and 90% correspond to fade margins of about $0.675\sigma$ and $1.282\sigma$, respectively. Slightly more precise expressions can be obtained by limiting the range of the fading to $-4\sigma<z<2\sigma$. However, this provides only a minor improvement in the fade margin estimate since the area under the tails of the Normal density function is quite small.

It is now straightforward to derive the distance to the cell edge, R, at any desired signal strength threshold, $P_{THRESH}$, and service reliability, F(z). From equations (1), (2), (3), and (4)

$$R = 10^{-(P_{THRESH} + FM_\sigma - A')/B} \qquad (5)$$

Any additional static (nonfading) margin such as building penetration losses are also incorporated into the $P_{THRESH}$ term. Thus, A', B and, $\sigma$ are all that is needed to determine the range from the base station to the cell edge for a given desired cell contour reliability.

Figure 6:
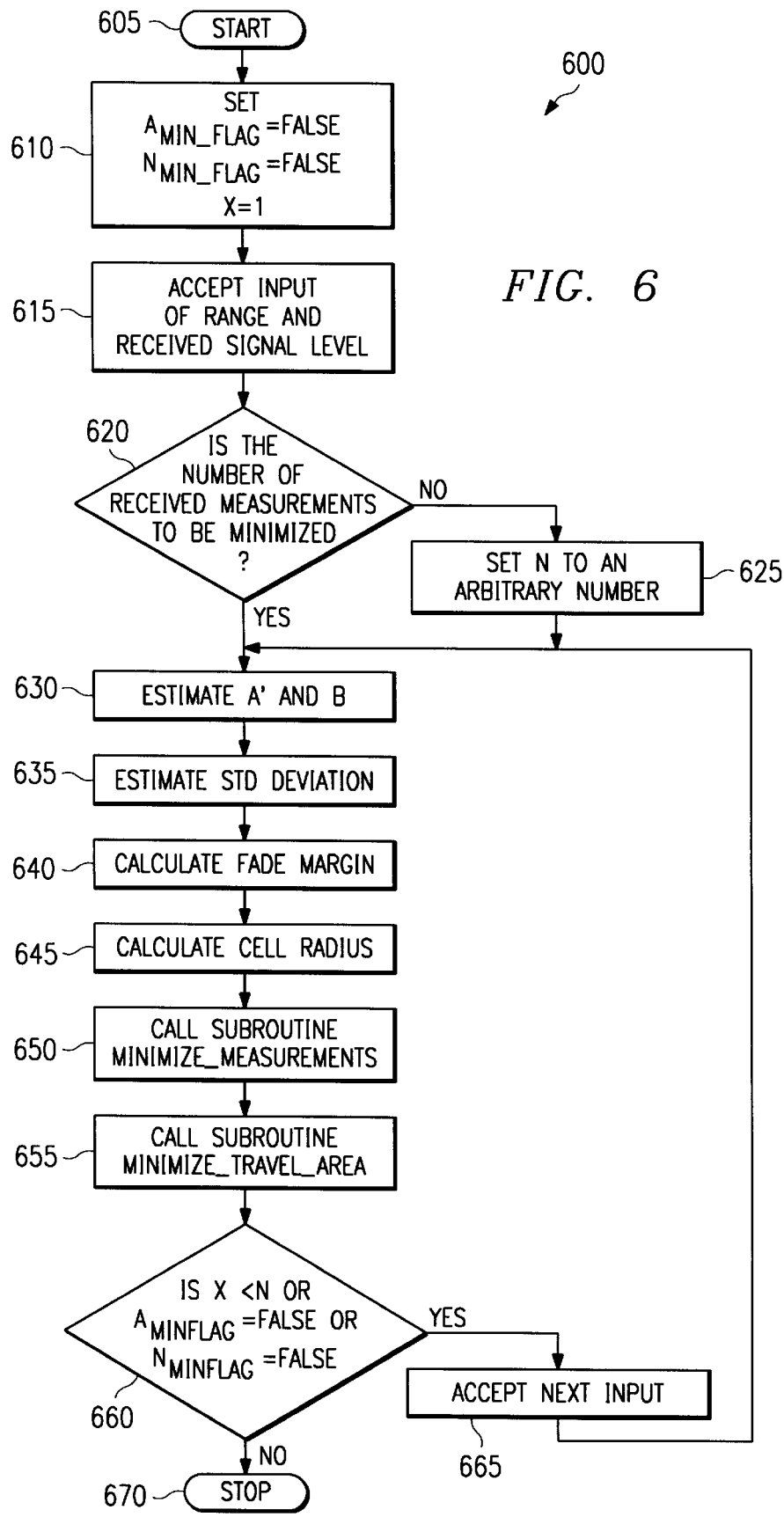
FIG. 6 illustrates in flowchart form a general method for calculating cell contour and edge reliability.

The methodology of determining cell radius in a computer 500 for a given desired contour reliability is illustrated in flowchart form in FIG. 6. Flowchart 600 control begins in Start box 605. If the area to be sampled in a drive test is to be minimized, then Aminflag is the variable which represents the status of the minimum geographic area traveled. It is initially set to False, which indicates that the number of received data from a minimized travel area within a geographic region have yet to be input. If the number of received data is to be minimized, then Nminflag is used to indicate the status of whether the minimum number of received data have been input yet. This flag is also initially set to False and is represented in step 610.

In step 615, the received data is input. The received data comprises range and received signal level information. This information may be input from computer memory, a receiver connected to an antenna for receiving data transmitted from a base station or to any other external source and may be in real-time, near real-time or delayed in time. The processing may occur in the field or a number of samples may be stored for processing at a later time at another central or field location.

In step 620, control passes to step 625 if the number of received data is not to be minimized and an arbitrary number of received data are then used. In any event, control is then passed to step 630 where the iterative process of generating the constants A' and B in the equation $P_r = A' - B r_L$ by using linear regression is accomplished. Linear regression is the well-known technique of finding the best fit linear approximation of a set of data points according to the equation y=mx+b; where b=A'=y-intercept, B=-m=slope (the slope is negative as would be expected for a received signal which attenuates as distance from the transmitter increases) and the logarithm of range $r_L$ corresponds to the independent variable x. For each received data the best fit line is recalculated and will change from one iteration to the next.

The standard deviation $\sigma$ is calculated in step 635 by means as described above during the discussion of FIG. 5.

In steps 640 and 645 fade margins and cell radius are calculated as also described above during the discussion of FIG. 5 according to equations 3), 4) and 5), respectively.

In step 650, an embodiment of the present invention allows for the calling of a subroutine to minimize the number of received data necessary for processing in calculating cell radius for a given level of contour reliability desired. This subroutine will be discussed later in reference to FIG. 7.

In step 655, another embodiment of the present invention allows for the calling of a subroutine to minimize the geographic area from which received data has been sampled. This feature allows a minimization of time and expense in planning and executing an optimized drive test. This subroutine will be discussed later in reference to FIG. 8.

In step 660, the returned data from the subroutines is examined to determine if analysis is completed by having the minimum number of received data processed and/or minimized area from which received data has been processed. If processing is complete, the program completes processing in step 670. If not, control loops back to step 630 and the process is repeated and the analysis is further refined.

Figure 7:
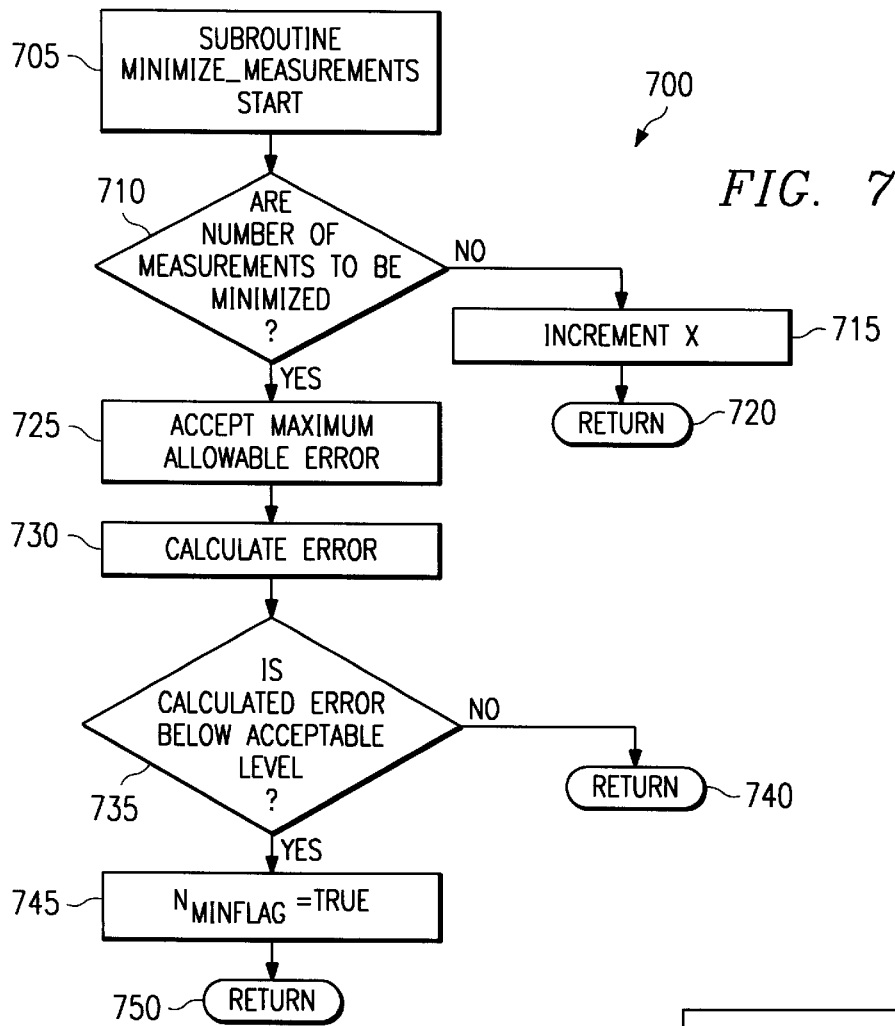
FIG. 7 illustrates in flowchart form a method for minimizing the number of measurement points required for calculating cell reliability.

Referring now to FIG. 7, the subroutine to minimize the number of received data will be discussed. If the number of received data is not to be minimized as determined in step 710, then counter X is incremented in step 715 and control is returned by step 720 to step 650 of the flowchart in FIG. 6. If the number of received data is to be minimized as determined in step 710, then the maximum allowable percentage error δR in cell radius is input in step 725. The error is calculated in step 735 according to the equation δR=RΔR, where $R=10^{-(P_{THRESH}+FM_\sigma-A')/B}$ and $$\Delta R \approx \frac{3.821\hat{\sigma} + 4.619}{N}$$

for values of N samples. If δR does not fall below the maximum allowable predetermined target value, then control returns by step 740 to step 650 of the flowchart of FIG. 6. If δR does fall below the maximum allowable error in step 735, then the variable Nminflag is set to True in step 745 and control returns by way of step 750 to step 650 of the flowchart of FIG. 6.

Figure 8:
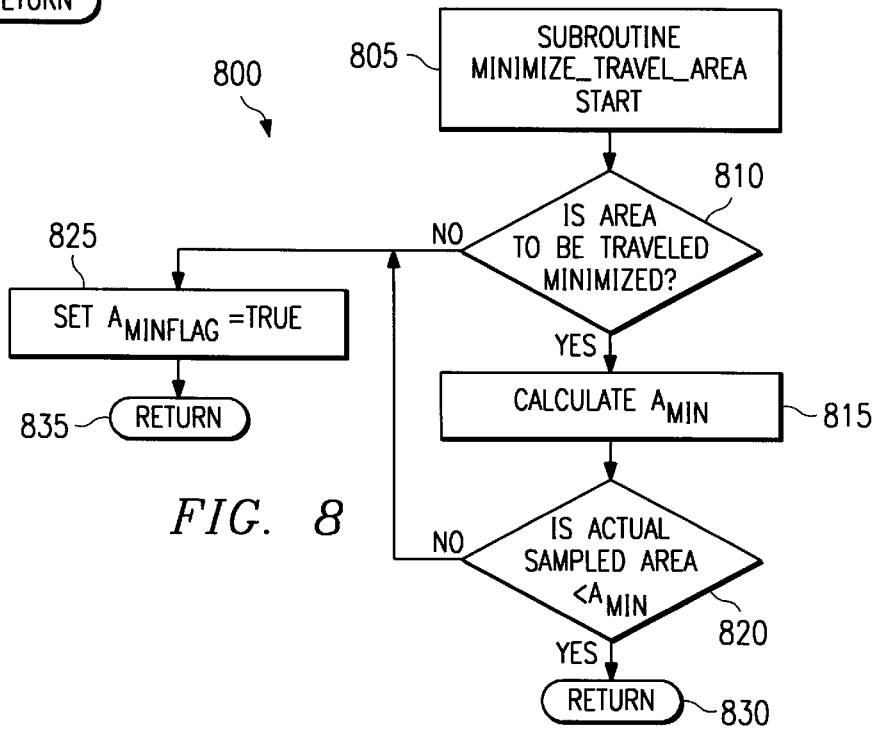
FIG. 8 illustrates in flowchart form a method for minimizing the area from which a number of measurement points are required for calculating cell reliability.

FIG. 8 will now be discussed. Subroutine Minimize travel area begins in step 805 and passes control to step 810. If the received data is not to be gathered from a minimized geographic area, then control transfers from step 810 to step 825 where the variable Aminflag is set to true. Variable Aminflag when set true indicates that the area traversed need not be minimized at all or that it already has been minimized. Control is returned by step 835 to step 655 of the flowchart of FIG. 6.

If the area to be traveled is to be minimized, then control passes from step 810 to 815 where Amin is calculated according to the equation $$A_{min} = 100\frac{r^2}{R^2}\% = \left(\frac{100}{R}\right)^2 \frac{(3.821\sigma + 4.619)}{\pi \Delta R};$$

where $$\Delta R \approx \frac{3.821\hat{\sigma} + 4.619}{N}, \quad R = 10^{-(P_{THRESH} + FM_\sigma - A')/B}$$

and σ is the estimated standard deviation of the lognormal fading in the cell. In step 820, Amin is compared to the actual traveled area and if the actual sampled area is greater than Amin, then control is passed to step 825 where Aminflag is set true indicating that the received data originates from a large enough geographic area and control returns by step 835 to step 655 of the flowchart of FIG. 6. If the actual sampled area is less than Amin, then Aminflag remains set to False and control returns by step 830 to step 655 of the flowchart of FIG. 6.

In another embodiment of the present invention, cell area reliability is measured and predicted.

The methodology of determining cell radius in a computer 500 for a given desired cell area reliability is also illustrated in generic flowchart form in FIG. 6. The basic principles are analogous as described above in reference to cell contour reliability. Flowchart 600 control begins in Start box 605. If the area to be sampled in a drive test is to be minimized, then Aminflag is the variable which represents the status of the minimum geographic area traveled. It is initially set to False, which indicates that the number of received data from a minimized travel area within a geographic region have yet to be input. If the number of received data is to be minimized, then Nminflag is used to indicate the status of whether the minimum number of received data have been input yet. This flag is also initially set to False and is represented in step 610.

In step 615, the received data is input. The received data comprises range and received signal level information. This information may be input from computer memory, a receiver connected to an antenna for receiving data transmitted from a base station or to any other external source and may be in real-time, near real-time or delayed in time. The processing may occur in the field or a number of samples may be stored for processing at a later time at another central or field location.

In step 620, control passes to step 625 if the number of received data is not to be minimized and an arbitrary number of received data are then used. In any event, control is then passed to step 630 where the iterative process of generating the constants A' and B in the equation $P_r=A'-Br_L$ by using linear regression is accomplished. For each received data the best fit line is recalculated and will change from one iteration to the next.

The standard deviation σ is calculated in step 635 by means as described above during the discussion of FIG. 5.

In steps 640 fade margins are calculated as also described above during the discussion of FIG. 5 according to equations 3) and 4), respectively.

In step 645 cell radius R for a given cell area reliability is calculated using the following equation and solving for R:

$$F_u = Q(a + b \ln R) + \frac{e^{-\frac{2a}{b}+\frac{2}{b^2}}}{R^2}\left[1 - Q\left(a + b \ln R - \frac{2}{b}\right)\right];$$

where $F_u$ is the area reliability, $$Q(x) = \frac{1}{\sqrt{2\pi}} \int_{-\infty}^{x} e^{-\frac{t^2}{2}} dt,$$

$$a = \frac{P_{THRESH} - A'}{\sigma} \quad \text{and} \quad b = \frac{B \log_{10} e}{\sigma}.$$

In step 650, an embodiment of the present invention allows for the calling of a subroutine to minimize the number of received data necessary for processing in calculating cell radius for a given level of cell area reliability desired. This subroutine will be discussed later in reference to FIG. 7.

In step 655, another embodiment of the present invention allows for the calling of a subroutine to minimize the geographic area from which received data has been sampled. This feature allows a minimization of time and expense in planning and executing an optimized drive test. This subroutine will be discussed later in reference to FIG. 8.

In step 660, the returned data from the subroutines is examined to determine if analysis is completed by having the minimum number of received data processed and/or minimized area from which received data has been processed. If processing is complete, the program completes processing in step 670. If not, control loops back to step 630 and the process is repeated and the analysis is further refined.

Referring now to FIG. 7, the subroutine to minimize the number of received data will be discussed. If the number of received data is not to be minimized as determined in step 710, then counter X is incremented in step 715 and control is returned by step 720 to step 650 of the flowchart in FIG. 6. If the number of received data is to be minimized as determined in step 710, then the maximum allowable error $\Delta F_u$ in cell radius is input in step 725. The error is calculated in step 735 according to the equation $$\Delta F_u \approx \frac{(0.1143\hat{\sigma} + 0.2886)\hat{F}_u(1 - \hat{F}_u)}{\sqrt{N}},$$

where $$F_u = Q(a + b \ln R) + \frac{e^{\frac{-2a}{b} + \frac{2}{b^2}}}{R^2}\left[1 - Q\left(a + b \ln R - \frac{2}{b}\right)\right],$$

$F_u$ is the area reliability, $$Q(x) = \frac{1}{\sqrt{2\pi}}\int_{-\infty}^{x} e^{-\frac{t^2}{2}} dt,$$

$$a = \frac{P_{THRESH} - A'}{\sigma} \quad \text{and} \quad b = \frac{B\log_{10} e}{\sigma}$$

as described above for values of N samples. If the error does not fall below the maximum allowable predetermined target value, then control returns by step 740 to step 650 of the flowchart of FIG. 6.

If the error does fall below the maximum allowable error in step 735, then the variable Nminflag is set to True in step 745 and control returns by way of step 750 to step 650 of the flowchart of FIG. 6.

FIG. 8 will now be discussed with respect to minimizing sampling area with respect to cell area reliability. Note that these calculations are equivalent to the calculations for cell contour reliability Subroutine Minimize travel area begins in step 805 and passes control to step 810. If the received data is not to be gathered from a minimized geographic area, then control transfers from step 810 to step 825 where the variable Aminflag is set to true. Variable Aminflag when set true indicates that the area traversed need not be minimized at all or that it already has been minimized. Control is returned by step 835 to step 655 of the flowchart of FIG. 6.

If the area to be traveled is to be minimized, then control passes from step 810 to step 815 where Amin is calculated according to the equation $$A_{min} = 100\frac{r^2}{R^2}\% = \left(\frac{100}{R}\right)^2 \frac{(3.821\sigma + 4.619)}{\pi \Delta R};$$

where $$\Delta R \approx \frac{3.821\hat{\sigma} + 4.619}{N}, \quad R = 10^{-(P_{THRESH} + FM\sigma - A')/B}$$

and $\sigma$ is the estimated standard deviation of the lognormal fading in the cell. In step 820, Amin is compared to the actual traveled area and if the actual sampled area is greater than Amin, then control is passed to step 825 where Aminflag is set true indicating that the received data originates from a large enough geographic area and control returns by step 835 to step 655 of the flowchart of FIG. 6. If the actual sampled area is less than Amin, then Aminflag remains set to False and control returns by step 830 to step 655 of the flowchart of FIG. 6.

The methodology illustrated in FIGS. 6–8 will now be discussed in more detail as applied to both cell contour and cell area reliability.

A simulation is used to determine the probability densities of the following two random variables:

$$e_{F_u} = \frac{F_u - \hat{F}_u}{F_u}$$

$$e_R = \frac{R - \hat{R}}{R}$$

where $e_{F_u}$ is the relative error of the area availability estimate as computed from equation (a7);

$e_R$ is the relative error of the estimate of the range to the cell edge;

$F_u$ is the true area reliability computed from equation (a7);

$\hat{F}_u$ is the estimated area reliability computed from equation (a7);

R is the true range to the cell edge computed from equation (5); and $\hat{R}$ is the estimated range to the cell edge computed from equation (5).

Figure 9A:
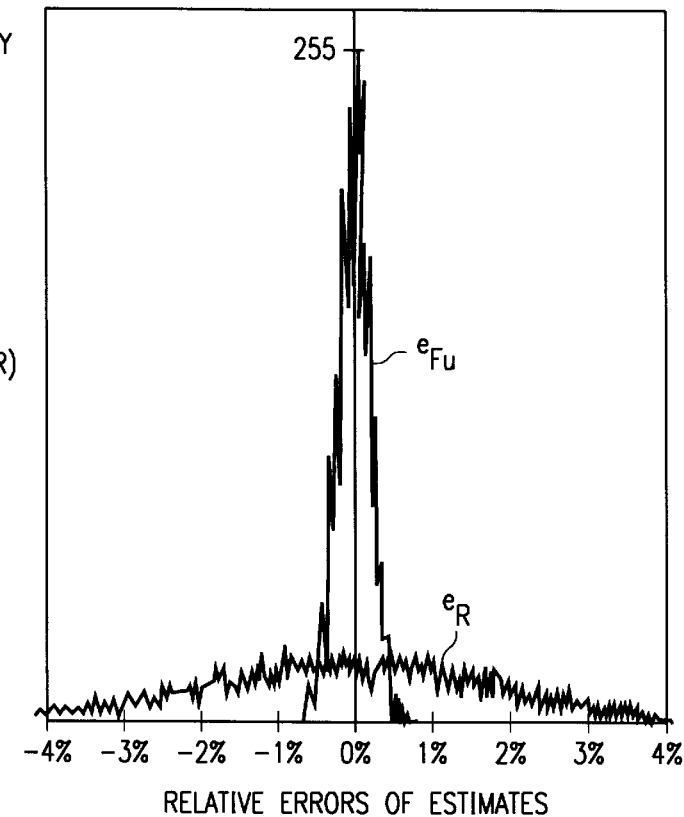
FIG. 9a illustrates histogram of the relative probability densities of cell reliability estimates for contour and edge reliability for 75% cell edge reliability.
Figure 9B:
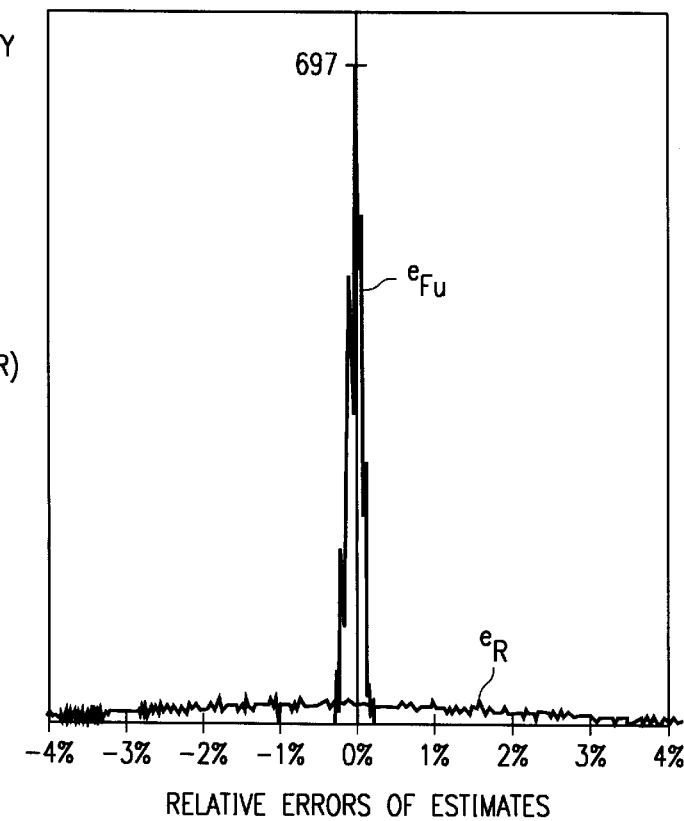
FIG. 9b illustrates histogram of the relative probability densities of cell reliability estimates for contour and edge reliability for 90% cell edge reliability.
Figure 10A:
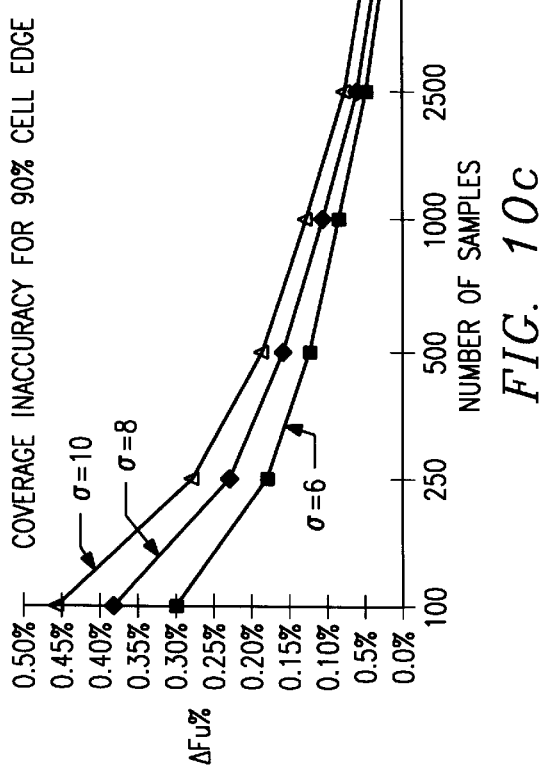
FIG. 10a illustrates range inaccuracy for a 75% cell edge reliability.
Figure 10B:
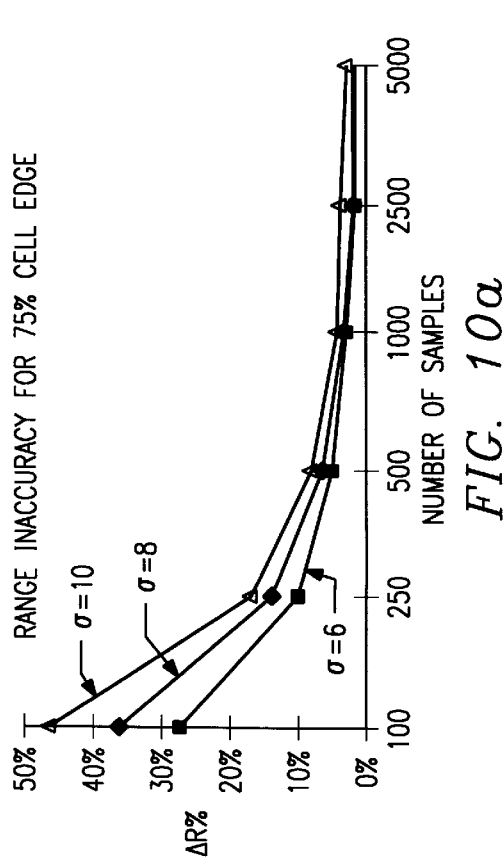
FIG. 10b illustrates coverage inaccuracy for a 75% cell edge reliability.
Figure 10C:
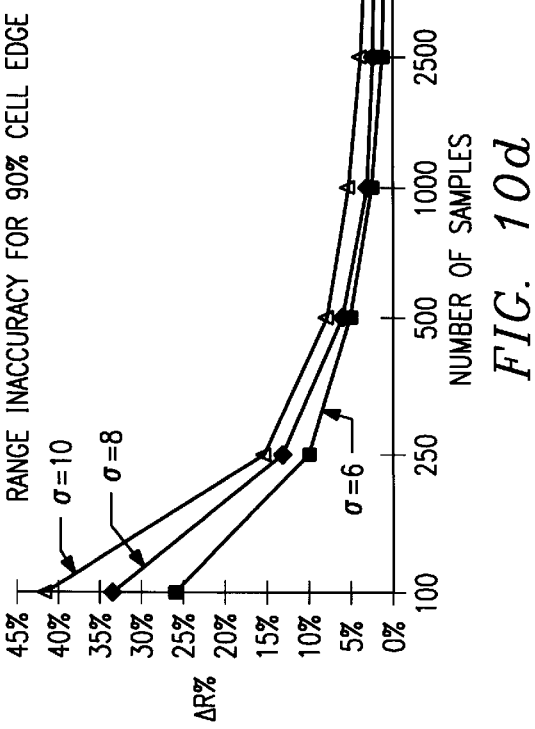
FIG. 10c illustrates range inaccuracy for a 90% cell edge reliability.
Figure 10D:
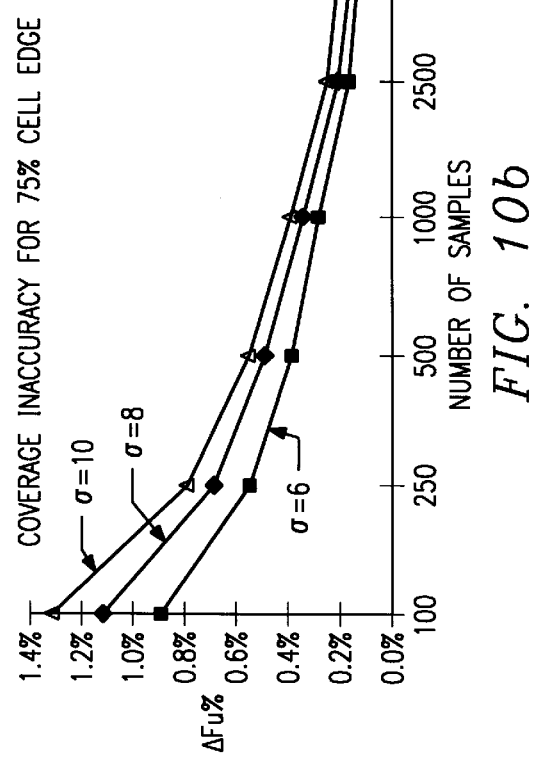

Typical probability densities for $e_{F_u}$ and $e_R$ are shown in FIGS. 9a and 9b. Note that the error of the cell radius estimate, $e_R$, is comparable in FIGS. 9a and 9b. However, $e_{F_u}$ is almost a factor of two smaller for the 90% cell edge reliability design. The histograms in FIG. 9 illustrate that both $e_R$ and $e_{F_u}$ are well modeled as zero-mean Normal random variables, and thus, only their respective variances are needed to characterize the accuracies of the estimates $\hat{R}$ and $\hat{F}_u$. These are determined empirically via Monte Carlo simulation.

The zero-mean properties of both $e_R$ and $e_{F_u}$ are nearly independent of the nonuniformities of finite sampling commonly found in drive test data. That is, $\hat{R}$ and $\hat{F}_u$ are not easily biased by the data collection process, giving these estimators a significant accuracy advantage over simply estimating the reliability from a proportion of signal strength values that are above a threshold. The main difference is that the regression does not directly estimate a probability but rather the propagation parameters: $\hat{A}'$, $\hat{B}$ and $\hat{\sigma}$ of each cell. In addition, the area reliability, $\hat{F}_u$ from equation (a7), is a function of four variables: $\hat{R}$, $\hat{A}'$, $\hat{B}$ and $\hat{\sigma}$ and thus does not depend as much on errors in $\hat{R}$, as does the method of estimating RF reliability from a proportion of signal strength values.

In determining the inaccuracy, $\Delta R$, of the estimate of the cell radius at a 95% confidence level. The inaccuracy is measured from empirical histograms by simulating $e_R$ and determining $\Delta R$ such that $$P(R - \Delta R \leq \hat{R} \leq R + \Delta R) = 95\%$$

The inaccuracy of the range estimate, $\Delta R$, is determined by the following two-sided test $$c = F(z_c) = \frac{1}{\sqrt{2\pi}}\int_{-z_c}^{z_c} e^{-\frac{t^2}{2}} dt$$

where the $z_c$ variable in the above equation is chosen to yield the desired confidence level, c. For example, if c=95%, then $z_c$=1.96. Since $e_R$ has a mean of zero, the corresponding two-sided range inaccuracy is $$\pm \Delta R = \pm 1.96\sqrt{VAR(e_R)}$$

Likewise, the inaccuracy of the area reliability estimate, $\hat{F}_u$, is estimated from histograms of $e_{F_u}$ and determining $\Delta F_u$ such that $$P(\hat{F}_u \leq F_u + \Delta F_u) = 95\%$$

Since $e_{F_u}$ also has a mean of zero, the inaccuracy, $\Delta F_u$, (one sided 95% confidence interval) of the coverage estimate is $$\Delta F_u = 1.645\sqrt{VAR(e_{F_u})}$$

Each point in the accuracy plots in FIG. 10 represents the precision (at 95% confidence) that is obtained after simulating and processing five million signal strength values.

Note that 1000 samples in the regression are needed for about a ±3% inaccuracy in the cell radius estimate. However, even with 500 samples in the regression, the area availability estimate is extraordinarily accurate. The inaccuracy is less than 0.5% for cells designed with 75% cell edge reliability and within 0.2% for cells designed with 90% cell edge reliability.

The inaccuracies of both of the estimates $\hat{R}$ and $\hat{F}_u$ can be approximated by the following expressions which were determined empirically from the data in FIG. 10 with $$\Delta R \approx \frac{3.821\hat{\sigma} + 4.619}{N} \quad (6)$$

$$\Delta F_u \approx \frac{(0.1143\hat{\sigma} + 0.2886)\hat{F}_u(1 - \hat{F}_u)}{\sqrt{N}} \quad (7)$$

where

N is the number of samples in the regression;
$\hat{\sigma}$ is the estimated standard deviation of the lognormal fading in the cell; and
$\hat{F}_u$ is the estimated area reliability computed from equation (a7).

Note that the range inaccuracy in equation (6), $\Delta R$, is inversely proportional to the number of samples in the regression, N. Whereas, the area reliability inaccuracy in equation (7), $\Delta F_u$, is inversely proportional to the square root of the number of samples in the regression.

Figure 11:
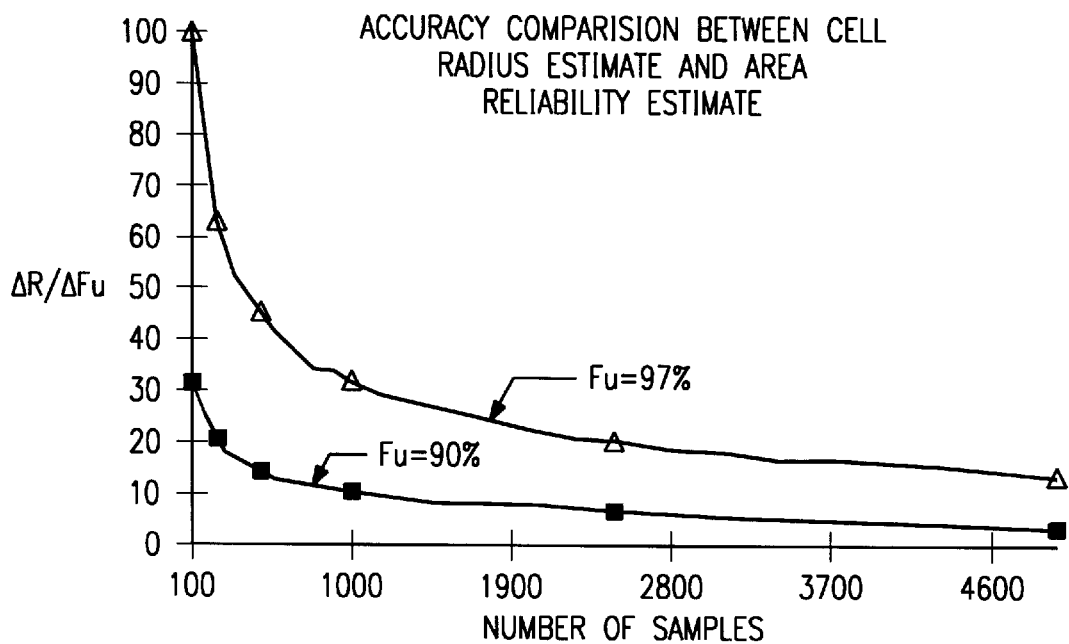
FIG. 11 illustrates an accuracy comparison between cell radius estimate and area reliability estimate.

From equations (6) and (7) it may be seen that the area reliability estimate is much more accurate than the estimate of the cell radius. This is illustrated in FIG. 11 where the relative accuracy of these two quantities is expressed as the ratio $\Delta R/\Delta F_u$. The accuracy is computed for two different area availability values (90% and 97%) and plotted as a function of the number of samples in the regression. Note that the estimate of the cell radius is more than ten times less accurate than the area reliability estimate for most of the situations of practical interest. The accuracy of the estimate of the cell radius (i.e., equation (7)) is thus the limiting factor in determining the quality of RF coverage over the cell area.

It is interesting to compare the magnitudes of the inaccuracies of the above area reliability measurements with those computed by estimating a proportion of signal strength measurements that are above a desired threshold. For 500 samples and 90% cell edge reliability the inaccuracy was shown to be about 5.8%. Thus, the area availability estimated $\hat{F}_u$ presented in this study is more than ten times the accuracy of estimates that are based on a proportion of signal strengths.

Minimizing cell area to be sampled will now be further discussed.

The cell radius is the limiting factor in determining the reliability of RF coverage. It was shown that the accuracy of the cell radius estimate is one of the major factors that determines the number of required signal strength measurements. In this section, these results are applied to the problem of determining the minimum percentage of area of a cell that must be driven to verify that the RF signal strength coverage meets a desired cell radius accuracy.

Figure 12A:
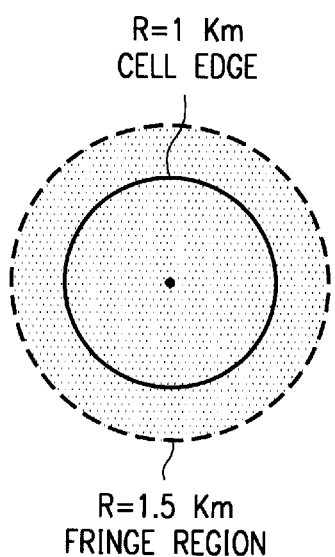
FIG. 12a illustrates the typical drive route in a small cell.
Figure 12B:
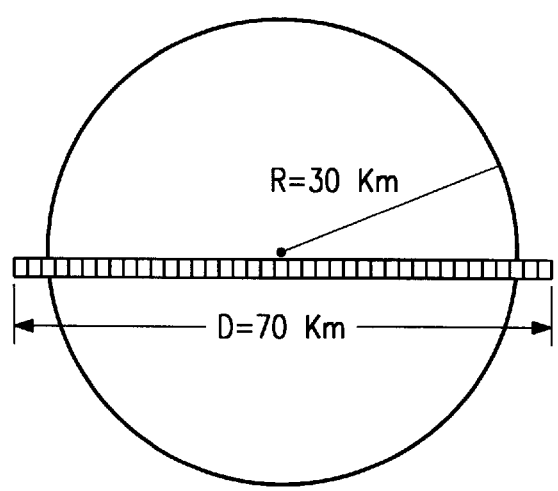
FIG. 12b illustrates the typical drive route in a large cell.

For the analysis that follows, it is assumed that the processing bin size for determining the signal power is 100 m×100 m and that the measurements are taken at time intervals that result in independent samples. Thus, fast fading effects are eliminated and variations in signal power are mostly due to lognormal fading. Equation (6) can be used to determine the minimum linear distance, D, that must be driven to achieve a desired accuracy in estimating the cell radius:

$$D = N \cdot 100 \text{ meters} \approx \frac{3.821\hat{\sigma} + 4.619}{\Delta R} 100 \text{ meters} \quad (8)$$

where it is assumed that drive routes are linear concatenations of 100 m×100 m bins. For example, for $\Delta R=10\%$, and $\hat{\sigma}=8$ dB, the minimum required distance is D=35 km (about 22 miles). For this case, independent of cell radius, about 22 miles of drive test data must be collected for a 10% error in the cell radius estimate (and a lognormal fading of 8 dB). The main point is that for a desired inaccuracy in the estimate of the cell radius, $\Delta R$, a fixed linear distance, D, must be driven independent of the actual cell radius, R. As illustrated in FIG. 12a, this results in the requirement that small cells (e.g., R=1 km) must be driven everywhere and sometimes overdriven. However, note that for large cells (e.g., R=30 km, FIG. 10b) often only a few primary roads need be to be driven. Note that the scale in FIG. 12a is magnified about 13 times that of FIG. 12b. Also, in FIG. 12 it is assumed that $\Delta R=5\%$, $\hat{\sigma}=8$ dB, and D=70 km (about 44 miles).

Thus, equation (8) specifies the theoretical minimum length of a particular drive route, D. The actual length required for real drive tests will be longer. For example, in many small cells it is unlikely that a contiguous drive route of length, D, exists. Also, for large cells the objective may be ubiquitous coverage rather than coverage of primary roads, requiring additional driving. Although these effects lead to drive routes that are somewhat longer than D, they do not diminish the importance of equation (8) as a lower bound.

Alternatively, the minimum area of a cell that needs to be drive tested for a given cell edge accuracy can also be determined. The number of independent 100 m×100 m bins in a cell of radius, r, is $$N = \frac{\pi r^2}{100^2} \quad (9)$$

Since the number of required measurements is primarily governed by the accuracy of the cell edge estimate, equation (9) can be equated with equation (6) to determine the minimum percentage of area that must be sampled. This percentage is found by first solving for the minimum required radius of samples $$r = 100\sqrt{\frac{(3.821\hat{\sigma} + 4.619)}{\pi \Delta R}} \text{ (km)} \tag{10}$$

The radius in equation (10) defines the minimum circular area, $\pi r^2$, that must be driven to achieve a desired cell edge accuracy. For example, if this area is greater than or equal to the area of the cell, $\pi R^2$ (where R is the cell radius), then additional drive test samples must be taken outside of the cell. This is not a problem since the invention accommodates the additional required bins outside of the boundary of the cell. However, if $\pi r^2$ is greater than the area of the cell ($\pi R^2$), the N bins defined by equation (6) can be entirely contained within the cell.

Thus, the minimum percentage of area of a cell that must be driven to validate the RF coverage is $$A_{min} = 100 \frac{r^2}{R^2} \% = \left(\frac{100}{R}\right)^2 \frac{(3.821\hat{\sigma} + 4.619)}{\pi \Delta R} \tag{11}$$

where $\hat{\sigma}$ is the estimated standard deviation of the lognormal fading in the cell;

R is the cell radius (km);

$\Delta R$ is the inaccuracy of the estimate of the cell radius as specified in equation (6); and r (km) is the minimum required radius of samples determined from equation (10).

Figure 13:
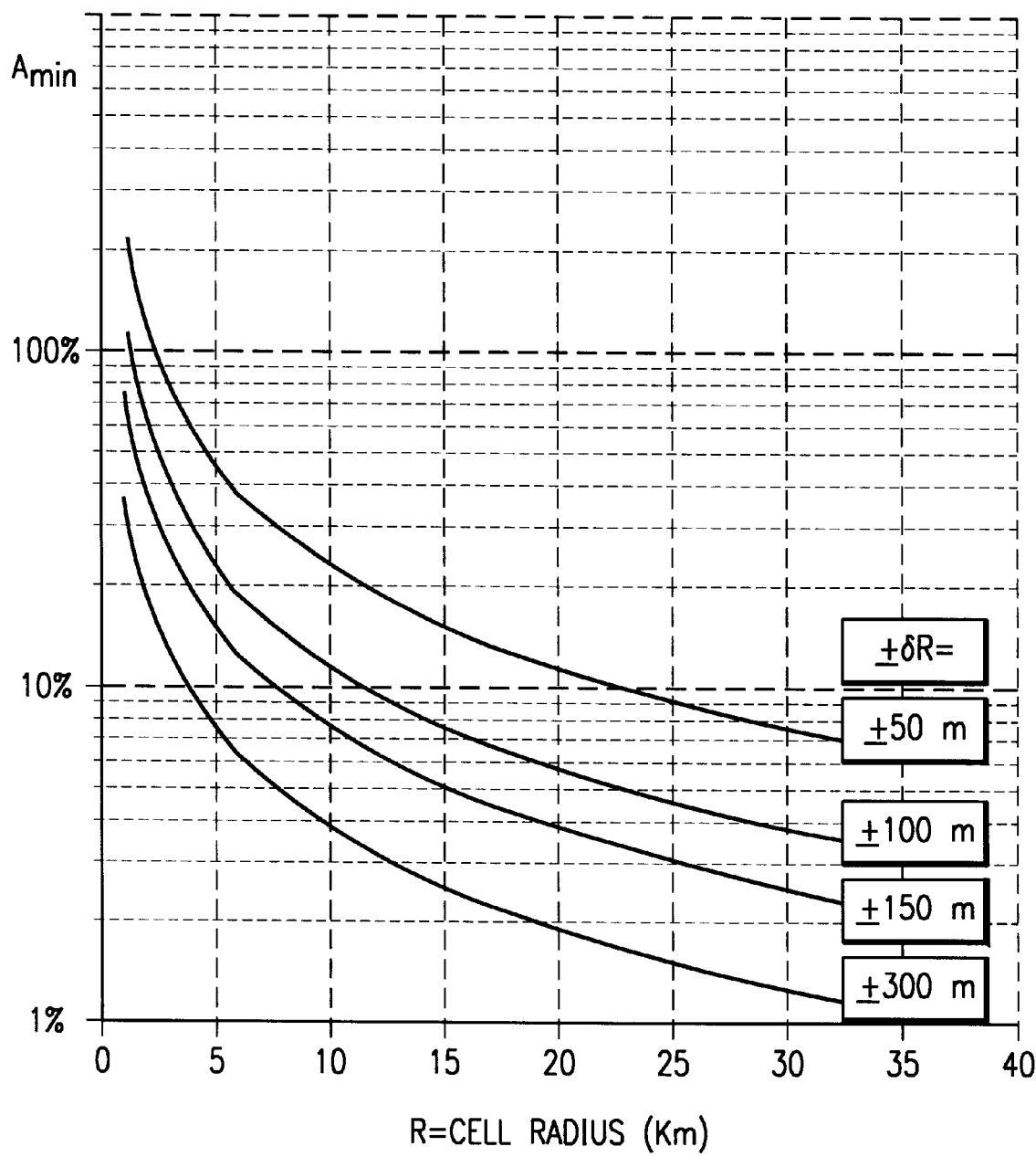
FIG. 13 illustrates the percentage area of a cell that must be sampled from to verify RF coverage.

Some results for typical cell radii are illustrated in FIG. 13. The quantity $A_{min}$ is chosen as the ordinate and plotted on a logarithmic scale to emphasize the differences in the curves. The abscissa in this figure is cell radius, R (km), and the parameter associated with each curve is the desired inaccuracy of the cell radius estimate in meters, $\delta R = R\Delta R$. For this figure it is assumed that $\hat{\sigma} = 8$ dB and that the measurement bin size is 100 m×100 m. The upper curve is approximately the lower limit of the cell edge accuracy, since an uncertainty of ±50 m covers the expanse of a single 100 m measurement bin. Note that for large cells only a small fraction of the cell area needs to be driven. For example, for an inaccuracy of $\pm\Delta R = \pm 150$ m and a cell radius of 15 km, only 5% of the cell area must be driven. However, for small cells and high accuracy in the cell edge estimates, a significant number of drive test samples must be taken outside of the cell's radius. For example, for $\pm\Delta R = \pm 50$ m, a cell with a 1 km radius must be overdriven by a percentage of area of about 222%. The results shown in FIG. 10 and FIG. 11 can be used to develop strategies that help minimize the time and money spent in drive testing cellular networks.

Equations (8) and (11) are important since they relate the minimum required distance and the minimum required cell area that must be driven to validate RF signal strength coverage to three major cellular design parameters: 1) the amount of lognormal fading in the cell, $\sigma$; 2) the desired cell radius uncertainty, $\Delta R$; and 3) for the case of determining the minimum required cell area, the cell radius, R.

The following summarizes the above results in a guideline that can be used to help select productive drive routes:

1. Select an acceptable level of inaccuracy, $\Delta R$, in the cell radius estimate. Typical values are in the range of 5% to 10% (of the cell radius). Choosing values smaller than 5% can lead to drive routes that are unnecessarily long. Choosing values much larger than 10% may lead to unacceptable levels of error in RF coverage.

2. Estimate the minimum distance, D, that must be driven to validate the RF coverage from equation (8). Note that this distance is the same in each cell, regardless of the cell radius.

3. Estimate the required "density" of signal strength measurements. A useful metric of sampling density is the minimum percentage of cell area that must be driven, $A_{min}$, shown in FIG. 13 and equation (11). Note that $A_{min}$ is primarily determined by the estimate of cell radius, as well as the desired inaccuracy, $\Delta R$. However, other factors such as the complexity of the propagation environment, projected traffic, etc., can also affect the density of required RF measurements. All of these factors directly influence the orientation of the drive routes by constraining them within areas that must be: (a) heavily drive tested (b) moderately drive tested or (c) lightly drive tested.

4. Select a key number important road segments within the cell whose combined lengths add up to the minimum required drive distance, D, defined in equation (8). If ubiquitous coverage is the objective, the majority of signal strength measurements should be taken in the vicinity of the cell edge (both inside and, if necessary, outside of the cell edge). In benign propagation environments, there is generally not much to be gained by driving in the direct vicinity of the base station (e.g., within 50% of the cell radius) since this area produces few signal strength outages.

If the cell is small (e.g., R<2 km), it is likely that the entire cell's area is important. For small cells, it is also likely that the length of all of the road segments within the cell will not be sufficient to meet the minimum drive distance requirement, D. For these cases, signal strength samples must be taken outside of the cell boundary. Identify as many key areas internal to the cell as possible and make sure they are adequately represented in the drive test. The remaining required signal strength samples should then be taken outside of the cell, as close as possible to the cell edge.

In contrast, for large cells (e.g., R>10 km), only a few key highways may be important and these should be heavily drive tested. For large cells there are usually more than enough road segments within the cell to meet the minimum drive distance requirement, D. After sampling the key highways, any remaining required measurements should then be randomly collected from within the cell, preferably near the cell edge (i.e., hand-off areas). In large cells, it is generally unnecessary to collect measurements significantly beyond the cell boundary.

Other such embodiments of the invention will be apparent to those skilled in the art from consideration of the specification and practice of the invention disclosed herein. It is readily apparent that the above described invention may be implemented in any type of radio communication system including any cellular system. It is intended that the specification and examples be considered as exemplary only, with a true scope and spirit of the invention being indicated by the following claims.

APPENDIX A

Relationship Between Cell Edge and Cell Area Reliability

Let the received power, $P_r$, at the edge of a cell, R, be given by $$P_r(R) = A' - B\log_{10}R + X \tag{a1}$$

where X is a normal zero mean random variable with variance $s^2$.

Similarly, the received power at a distance, r, is $$P_r(r) = A' - B\log_{10}r + X \tag{a2}$$

where it will be assumed that r<R. The outage probability, $P_{out}(r)$, at a particular range, r, from the base station is given by $$P_{out}(r) = P(A' - B\log_{10}r + X \leq P_{THRESH}) \quad \text{(a3)}$$

$$= F\left(\frac{P_{THRESH} - A' + B\log_{10}r}{\sigma}\right)$$

$$= 1 - Q\left(\frac{P_{THRESH} - A' + B\log_{10}r}{\sigma}\right)$$

and the corresponding service reliability is $$1 - P_{out}(r) = P(A' - B\log_{10}r + X > P_{THRESH}) \quad \text{(a4)}$$

$$= 1 - F\left(\frac{P_{THRESH} - A' + B\log_{10}r}{\sigma}\right)$$

$$= Q\left(\frac{P_{THRESH} - A' + B\log_{10}r}{\sigma}\right)$$

where $P_{THRESH}$ is the desired threshold and
$Q(x)=1-Q(-x)$
$Q(x)=1-F(x)$
$F(x)=P(\xi \leq x)$
$\xi \approx N(0,1)$ $$F(x) = \frac{1}{\sqrt{2\pi}} \int_{-\infty}^{x} e^{-\frac{t^2}{2}} dt$$

$$\frac{d}{dx}Q(x) = -\frac{1}{\sqrt{2\pi}} e^{-\frac{x^2}{2}}$$

Define $$(a + b\ln r) = \left(\frac{P_{THRESH} - A' + B\log_{10}r}{\sigma}\right)$$

where $$a = \frac{P_{THRESH} - A'}{\sigma} \quad \text{and} \quad b = \frac{B\log_{10}e}{\sigma}$$

Then from equation (a4), the edge reliability on a contour of range, r, is $$1 - P_{out}(r) = Q(a + b\ln r) \quad \text{(a5)}$$

The fraction of usable area, $F_u$, (i.e., area reliability) within the cell can be found by integrating the contour reliability across range $$F_u = \frac{1}{\pi R^2} \int_0^R [1 - P_{out}(r)] 2\pi r dr \quad \text{(a6)}$$

$$= \frac{2}{R^2} \int_0^R Q(a + b\ln r) r dr$$

Now consider the integral $$\int_0^R Q(a + b\ln r) r dr$$

$$t = a + b\ln r$$

$$r = e^{\frac{t-a}{b}}$$

$$dr = \frac{e^{\frac{t-a}{b}}}{b} dt$$

Thus $$\int_0^R Q(a + b\ln r) r dr = \int_{-\infty}^{a+b\ln R} Q(t) e^{\frac{t-a}{b}} \frac{e^{\frac{t-a}{b}}}{b} dt =$$

$$\frac{1}{b} \int_{-\infty}^{a+b\ln R} Q(t) e^{\frac{2(t-a)}{b}} dt = \frac{e^{\frac{-2a}{b}}}{b} \int_{-\infty}^{a+b\ln R} Q(t) e^{\frac{2t}{b}} dt$$

Now $$\int_{-\infty}^{a+b\ln R} Q(t) e^{\frac{2t}{b}} dt =$$

$$Q(t) \frac{be^{2t/b}}{2} \Big|_{-\infty}^{a+b\ln R} + \int_{-\infty}^{a+b\ln R} \frac{b}{2\sqrt{2\pi}} e^{-\frac{t^2}{2}} e^{\frac{2t}{b}} dt =$$

$$Q(a + b\ln R) \frac{b}{2} e^{\frac{2(a+b\ln R)}{b}} + \frac{be^{\frac{2}{b^2}}}{2\sqrt{2\pi}} \int_{-\infty}^{a+b\ln R} e^{-\frac{1}{2}\left(t^2 - \frac{4t}{b} + \frac{4}{b^2}\right)} dt =$$

$$Q(a + b\ln R) \frac{b}{2} e^{\frac{2a}{b}} R^2 + \frac{b}{2} e^{\frac{2}{b^2}} \int_{-\infty}^{a+b\ln R} \frac{e^{-\frac{1}{2}\left(t - \frac{2}{b}\right)^2}}{\sqrt{2\pi}} dt =$$

$$Q(a + b\ln R) \frac{b}{2} e^{\frac{2a}{b}} R^2 + \frac{b}{2} e^{\frac{2}{b^2}} \left[1 - Q\left(a + b\ln R - \frac{2}{b}\right)\right]$$

Thus, the area reliability is $$F_u = \frac{2}{R^2} \int_0^R Q(a + b\ln r) r dr$$

$$= \frac{2}{R^2} \frac{e^{\frac{-2a}{b}}}{b} \left\{\left[\frac{R^2 b}{2} e^{\frac{2a}{b}} Q(a + b\ln R)\right] + \left[\frac{b}{2} e^{\frac{2}{b^2}} \left(1 - Q\left(a + b\ln R - \frac{2}{b}\right)\right)\right]\right\}$$

And finally, $$F_u = Q(a + b\ln R) + \frac{e^{\frac{-2a}{b} + \frac{2}{b^2}}}{R^2} \left[1 - Q\left(a + b\ln R - \frac{2}{b}\right)\right] \quad \text{(a7)}$$

What is claimed is:

1. A radiotelephone network comprising a mobile switching center; an optimized cell encompassing a geographic area with a cell boundary, said network having a predetermined RF reliability along said cell boundary; said cell has a radius R determined from a number N of received data indicating received power level and location data representative of a received signal from a transmitter within the cell and received within a traversed geographic region, wherein said radius R is calculated from coefficients A' and B, a fade margin $FM_o$, and a minimum acceptable signal strength threshold $P_{THRESH}$, said coefficients A' and B being coefficients for an equation $P_r = A' - Br_L$, wherein $P_r$ is the measured received power for a given location a distance r from said transmitter and $r_L$ is $\log_{10}r$, said fade margin $FM_o$ being based on a predetermined target reliability figure F(z) and an estimated standard deviation σ of lognormal fading for said received data.

2. The radiotelephone network of claim 1 wherein coefficients A' and B are estimated from linear regression analysis with said received data as inputs.

3. The radiotelephone network of claim 2 wherein said standard deviation σ is estimated by subtracting the received data from the linear regression generated mean trend of the received data.

4. The radiotelephone network of claim 1 wherein said fade margin $FM_\sigma$ is calculated by using the equation $FM_\sigma = z\sigma$, wherein z is calculated from the equation $$F(z) = \frac{1}{\sqrt{2\pi}} \int_{-\infty}^{z} e^{-\frac{t^2}{2}} dt.$$

5. The radiotelephone network of claim 1 wherein said radius R is calculated by using the equation $$R = 10^{-(P_{THRESH} + FM_\sigma - A')/B}.$$

6. A radiotelephone network comprising a mobile switching center; an optimized cell encompassing a geographic area with a cell boundary, said network having a predetermined RF reliability along said cell boundary; said cell has a radius R determined from a minimized number N of received data indicating received power level and location data representative of a received signal transmitted from a transmitter within the cell and received within a traversed geographic region where the traversed geographic region is minimized, wherein said radius R is calculated from coefficients A' and B, a fade margin $FM_\sigma$, and a minimum acceptable signal strength threshold $P_{THRESH}$, said coefficients A' and B being coefficients for an equation $P_r = A' - Br_L$, wherein $P_r$ is the measured received power for a given location a distance r from said transmitter and $r_L$ is $\log_{10} r$, said fade margin $FM_\sigma$ being based on a predetermined target reliability figure F(z) and an estimated standard deviation σ of lognormal fading for said received data.

7. The radiotelephone network of claim 6 wherein said coefficients A' and B are estimated from linear regression analysis with said received data as inputs.

8. The radiotelephone network of claim 7 wherein said standard deviation σ is estimated by subtracting the received data from the linear regression generated mean trend of the received data.

9. The radiotelephone network of claim 6 wherein said fade margin $FM_\sigma$ is calculated by using the equation $FM_\sigma = z\sigma$, wherein z is calculated from the equation $$F(z) = \frac{1}{\sqrt{2\pi}} \int_{-\infty}^{z} e^{-\frac{t^2}{2}} dt.$$

10. The radiotelephone network of claim 6 wherein said radius R is determined by using the equation $$R = 10^{-(P_{THRESH} + FM_\sigma - A')/B}.$$

* * * * *